T. L. VALERIUS.
BOTTLE CAPPING MACHINE.
APPLICATION FILED AUG. 2, 1911.

1,134,168.

Patented Apr. 6, 1915.
7 SHEETS—SHEET 2.

T. L. VALERIUS.
BOTTLE CAPPING MACHINE.
APPLICATION FILED AUG. 2, 1911.

1,134,168.

Patented Apr. 6, 1915.
7 SHEETS—SHEET 3.

Witnesses:
J. C. Devick.
G. Carl Parker.

Inventor:
Theodore L. Valerius,
By Luther L. Miller
Atty.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

BOTTLE-CAPPING MACHINE.

1,134,168.  Specification of Letters Patent.  Patented Apr. 6, 1915.

Application filed August 2, 1911. Serial No. 642,007.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Bottle-Capping Machines, of which the following is a specification.

This invention relates to a machine for automatically applying stopper disks or caps of the type now in common use to milk bottles while the latter are in cases.

One of the objects of the invention is to provide improved means for taking caps from the cap magazines and transferring them to the applying means.

Another object of the invention is to provide an improved cap-applying means which obviates the possibility of caps being pushed too far into the bottles.

A further object of the invention is to provide improved means for actuating the various parts of the machine.

Other objects and advantages of the invention will be pointed out in the following detailed description.

While the present embodiment of the invention is a hand-operated machine, it should be understood that the invention may be embodied in any type of machine desired.

In the accompanying drawings.

The exemplary embodiment herein shown of my invention comprises a framework consisting of two side castings 20. The lower portions of said castings are rigidly secured together by cross-rods 21, and the upper portions thereof are spaced apart and secured together by the various shafts of the machine and the plate upon which the cap-transferring slide moves. The bottle cases A having milk bottles *a* therein are carried upon a suitable support 22 fixed in the framework, said support having a pair of rails 23 thereon upon which the bottle case may be slidden into and out of position for the bottles to be operated on by the cap-applying mechanism.

Slidably mounted in a bearing 24 in the support 22 is a vertical rod 25, to the upper end of which is attached a suitable head 26 arranged to support the case of bottle when it is moved upwardly to the cap-applying means. The head 26 normally lies in a plane beneath the horizontal plane of the rails 23. To the lower end of the rod 25 is fixed a cross-bar 27 having its ends slidable in suitable guideways 28 in the side castings 20. A lever 29 having its forward end attached to ears 30 upon the cross-bar 27, is arranged to be pivotally moved by means to be later described to raise the bottle-case elevator 26. The rear end of said lever 29 is attached to an arm 31 upon a shaft 32 which is mounted in the side castings 20. As will be seen, the arm 31 will swing to permit the forward end of the lever 29 to move in a vertical plane.

Extending between and rigidly secured to the side castings 20 is a plate 33 (Fig. 3), the rear portion of which carries the cap magazines 34 and the forward portion of which has a plurality of openings therein in which are mounted sleeves 35 arranged to guide the cap-applying plungers 36 and the bottles into operative relation. The plate 33 has side flanges 37 which are secured to the castings 20 by suitable screws or bolts 38.

Above the forward portion of the plate 33 is a plunger guide-plate 39, the latter being secured to and spaced from the plate 33 by means of bolts 40 and spacing sleeves 41 surrounding said bolts.

Figure 3:
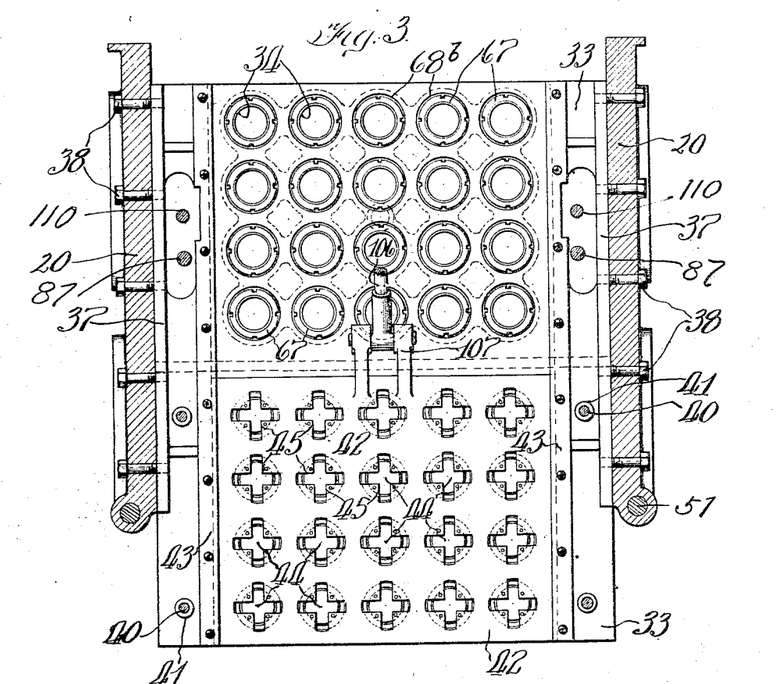
Fig. 3 is a section on line 3—3 of Fig. 2, showing the cap-transferring slide in its forward position.
Figures 11, 12, 13:
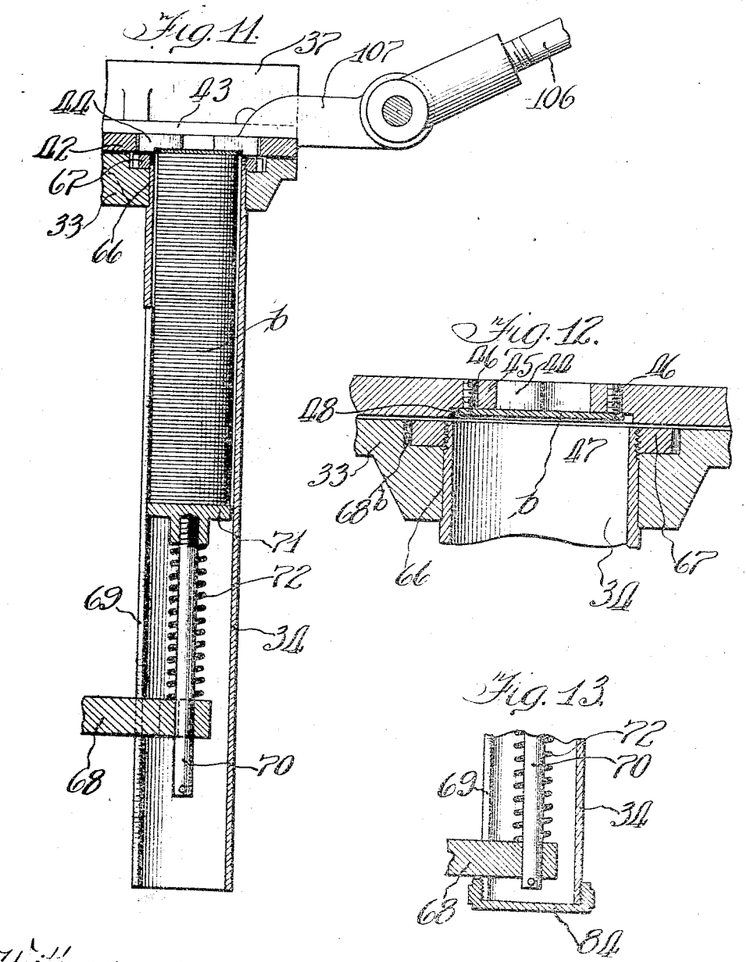
Fig. 11 is a vertical sectional view through one of the cap-holding tubes and associated parts.
Fig. 12 is an enlarged vertical sectional view through the upper portion of a cap tube and through the cap-transferring slide.
Fig. 13 is a sectional view through the lower portion of one of the corner cap tubes.
Figure 14:
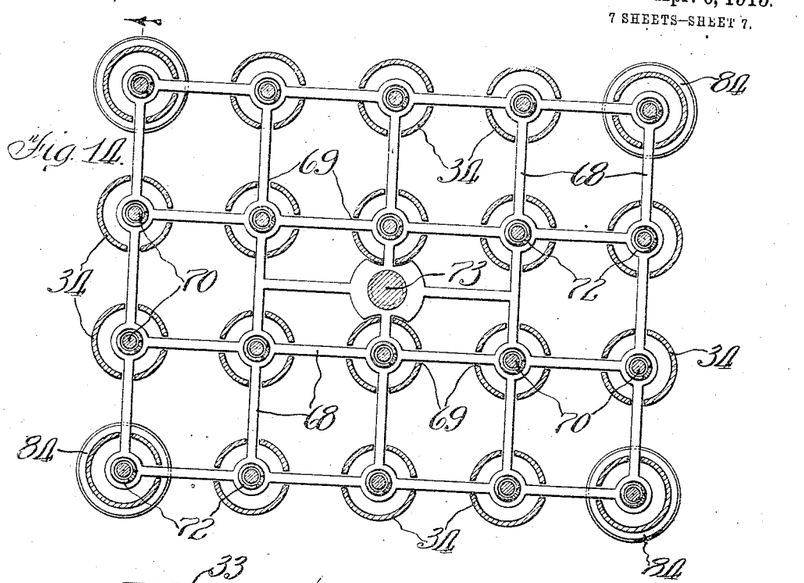
Fig. 14 is a horizontal section of the cap-supporting frame.

The caps are transferred from the cap magazines 34 at the rear of the plate 33 into position to be acted upon by the plungers 36 by means of a slide-plate 42 which is slidable in guideways 43 upon the plate 33 (see Figs. 3 and 12). Said plate has a plurality of openings 44 therein equal in number to the bottles in case A, each of said openings being in the form of a cross. In each of the projecting lugs 45 formed by the openings 44 is mounted a member, in this instance in the form of a screw 46, having a sharp point 47 at its lower end. The under side of the cap-slide 42 has a recess 48 beneath each of the openings 44, into which recesses the sharp points 47 project. Means is provided, as will hereinafter appear, for pressing the caps in the magazines 34 upwardly against the pins or points 47, said pins being of a length only sufficient to enter the top ones of the caps.

Figure 5:
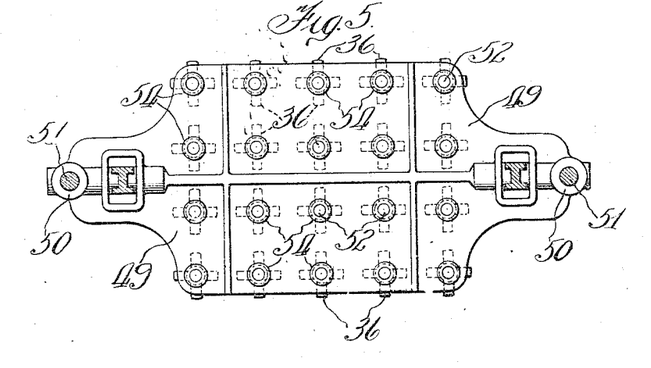
Fig. 5 is a plan view of the plunger-moving plate.
Figure 6:
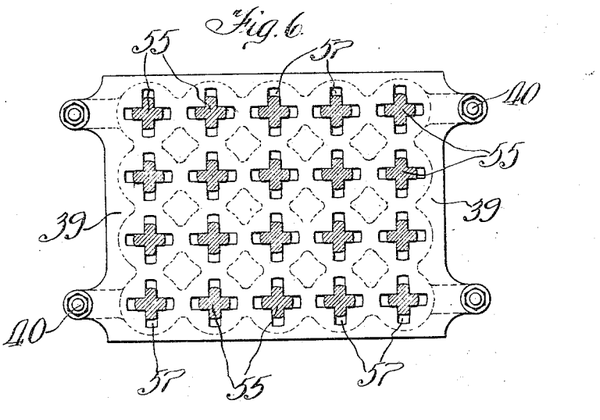
Fig. 6 is a view showing the plate for guiding the plungers, the plungers themselves being shown in section.
Figure 7:
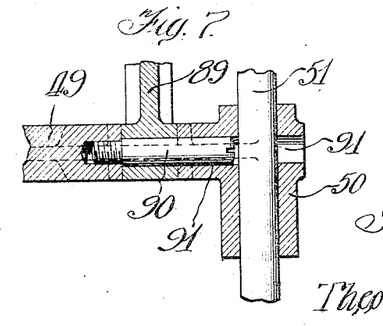
Fig. 7 is a sectional detail view showing the means for mounting the plunger-moving plate.

The cap-applying plungers 36 correspond in number to the number of bottles in the case A. Said plungers are carried by a plate 49 (Figs. 5 and 7), having sleeves 50 which are slidably mounted upon guide-rods 51 mounted in the upper portion of the side castings 20. Each of the plungers 36 comprises a stem 52 slidable in an opening 53 in the plate 49 (Fig. 8), said stem having an enlargement 54 upon its upper end to limit its downward movement. The lower portion or head 55 of the plunger is cruciform in sectional view (see Fig. 6). The plungers are normally held in their lowermost position with respect to the plate 47 by means of coiled springs 56 surrounding the stems 52 of the plungers. The plunger guide-plate 39 has a plurality of openings 57 therein in which the plungers 36 are guided, said openings corresponding in shape to the cross-sectional shape of the plunger heads 55, as shown in Fig. 6.

Figures 8, 9, 10:
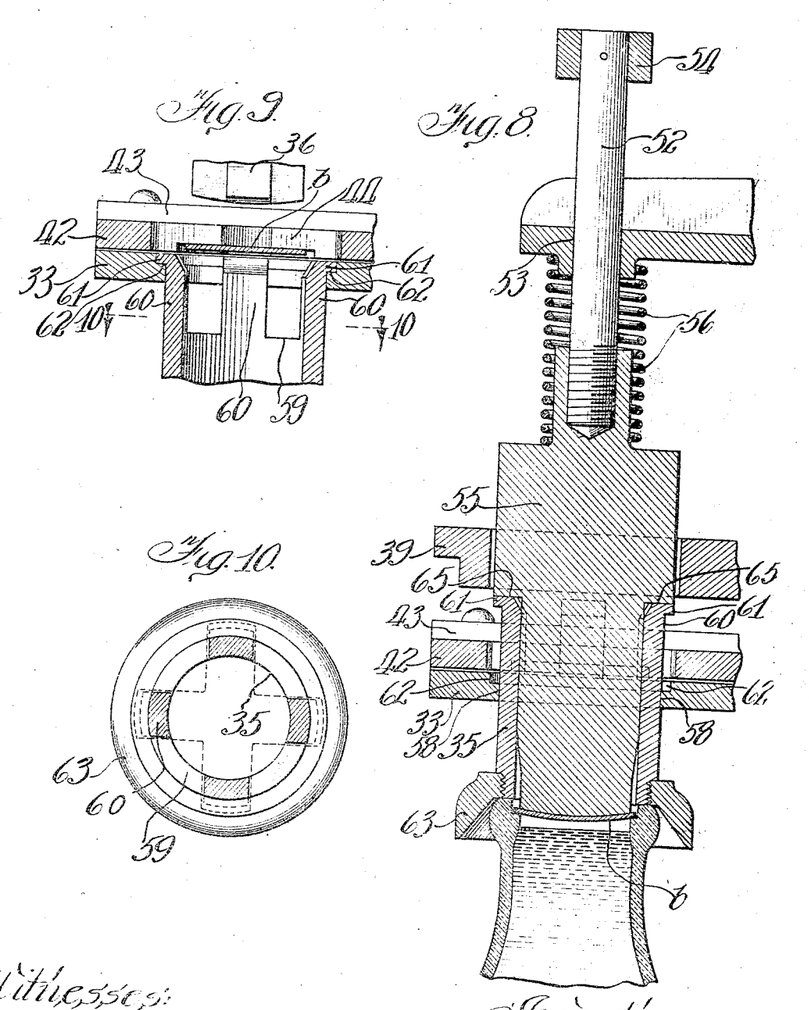
Fig. 8 is a fragmental vertical section through one of the cap-applying plungers and coöperating means.
Fig. 9 is a fragmental section taken substantially in the same plane as Fig. 8 and showing the construction of the upper end of the plunger sleeve and its connection with the remaining parts.
Fig. 10 is a section on line 10 10 of Fig. 9.

The sleeves 35 are slidably mounted in openings 58 in the main plate 33. The upper end of each sleeve has relatively deep notches 59 therein forming four fingers 60 which are arranged to pass through the four branches of the cruciform openings 44 in the cap-slide when the sleeves 35 are raised by the bottles a, as shown in Fig. 8. Each of the fingers 60 has a flange 61 adapted to seat in a recess 62 in the wall of the openings 58 in the plate 33 to support the sleeve. The lower ends of the sleeves have bells or flaring mouths 63 attached thereto for the purpose of centering the bottles with relation to the sleeves.

After the cap-slide 42 has carried a set of caps into position above the sleeves 35, as shown in Fig. 9, the bottles are raised into engagement with the sleeves, and the plungers 36 are depressed by the plate 49 to remove the caps from the slide 42 and carry them through the sleeves 35 and into the mouths of the bottles. In order to insure that the caps will not be carried too far into the bottles, shoulders 65 are formed on the lobes of each of the plunger heads 55, the portions of the plungers below said shoulders being adapted to fit into the sleeves 35, and the portions above said shoulders being of a larger size. The shoulders 65 are arranged to engage the upper ends of the sleeves, so that the plungers can descend into the sleeves only a distance sufficient to properly position a cap upon a bottle, as shown in Fig. 8. Further lowering of the plunger-moving plate 49 is permitted by relative movement between said plate and the plunger stems 52, such movement being resisted by the springs 56.

Figure 15:
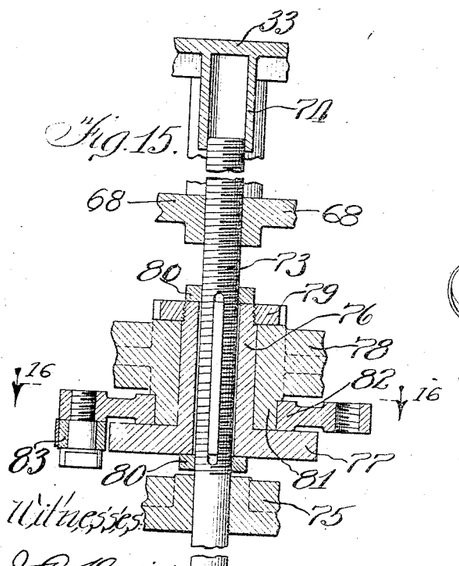
Fig. 15 is a transverse section of the means for vertically adjusting said frame.
Figure 16:
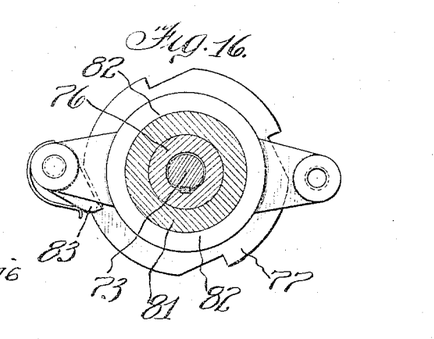
Fig. 16 is a section along the lines 16 of Fig. 15.

In the rear portion of the main plate 33 is a series of openings 66 corresponding in number to the number of plungers 36. Tubes 34 registering with each of the openings 66 have their upper ends fitting in the openings and suitably held therein by means of nuts 67 threaded in the ends of the tubes and seated in annular recesses 68ª in the upper face of the plate 33. (See Figs. 11 to 14). In the tubes 34 are maintained a suitable supply of caps b. The caps are supported upon a frame comprising bars 68 extending through slots 69 in the tubes 34, said bars having vertically slidable pins 70 mounted therein within the tubes 34. The upper ends of pins 70 carry heads 71 upon which the caps b rest. Said pins are normally pressed upwardly by means of coiled springs 72 surrounding the pins between the heads 71 and the bars 68. The frame 68 has a vertical screw-shaft 73 threaded therein, the upper end of said shaft being guided in a tubular boss 74 on the under side of the main plate 33. The lower end of the shaft 73 is slidably guided in a cross-bar 75 having its ends fixed to the side castings 20. As the supply of caps b is gradually diminished by the cap-transferring means, it is necessary to raise the frame 68 in the tubes 34. This raising may be accomplished by turning the screw-shaft 73. In the present embodiment I have provided means for conveniently rotating said shaft to raise the frame 68, said means comprising a sleeve 76 which is longitudinally slidable upon the screw-shaft 73, but is splined thereto to prevent relative rotation of these parts (see Figs. 15 and 16). At one end of the sleeve 76 is a ratchet wheel 77. The sleeve 76 is rotatably mounted in a cross-head 78 which is arranged to be raised by means to be later described to press the caps upwardly against the cap-transferring slide 42. A nut 79 turned upon the end of the sleeve 76 holds said sleeve in position in the cross-head 78. Nuts 80 threaded on the screw-shaft 73 at the ends of the sleeve 76 cause the shaft 73 to follow the vertical movements of the cross-head 78 and thus raise and lower the cap-supporting frame 68. Rotatably mounted upon an annular flange 81 on the cross-head 78 is a ring 82 which carries a spring-pressed pawl 83 adapted to engage the ratchet wheel 77. The ring 82 may be oscillated by any suitable means not herein shown. The lower limit of movement of the cap-supporting frame 68 is determined by closures 84 upon the lower ends of the corner tubes 34.

When the cross-head 78 is moved upwardly to elevate the cap raising frame 68, the top cap in each of the tubes 34 will be pressed up against the sharp points 47 so that when the frame 68 is lowered said top one of each tier of caps will be held by the cap-transferring slide.

The means for raising the bottle-case and for depressing the plungers 36 comprises a pair of levers 85 mounted on a rock-shaft 86 which is mounted in the side castings 20, the rear end of said levers being connected by means of links 87 with a cross-bar 88 which may form an integral part of the case-elevator lever 29. The forward ends of the levers 85 are connected with the the plunger-moving plate 49 through the medium of links 89. The lower ends of said links may be mounted upon pins 90 which are inserted in openings 91 in the ends of the plate 49 before said plate is placed in relation to the guide-rods 51 (see Fig. 7).

As hereinbefore stated, the present embodiment of my invention is arranged to be operated by hand, the operating means herein shown comprising a shaft 92 rotatably mounted in the side castings 20 and having a crank-handle 93 fixed thereon. A second shaft 94 is mounted in the side frames 20 rearwardly of the shaft 92 and the shafts 92 and 94 are connected by means of a sprocket chain 95 running over the sprocket wheels 96 and 97 respectively. One rotation of the main shaft 94 is arranged to move the parts of the machine through a complete cycle. In the present instance the crank-handle 93 is rotated three revolutions to one revolution of the main shaft, this construction requiring only a relatively small amount of power to rotate the crank-handle 93.

Figure 4:
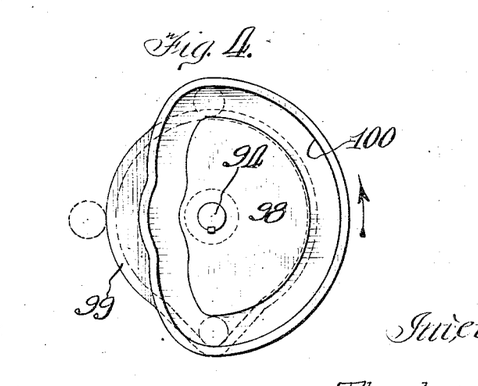
Fig. 4 is a detail view of the cam for actuating the parts.

Upon the main shaft 94 is fixed a cam-wheel 98 having a cam portion 99 arranged to be exteriorly engaged and also having a cam-groove 100 therein. (See Fig. 4.) Upon one of the plunger-operating levers 85 is an extension 101 (Fig. 1), carrying a roller which travels in the cam-groove 100, thus simultaneously operating the plungers 36 and the case-elevator 26. In the upper portion of the framework is rotatably mounted a shaft 102 having an arm 103 thereon which has a link 104 attached to its end, said link having a roller traveling in the cam-groove 100. An arm 105 fixed upon said shaft 102 is connected by means of an adjustable link 106 with the cap-transferring slide 42, said link being attached to ears 107 upon the rear end of said plate.

A shaft 108 mounted in the framework has fixed thereto a pair of arms 109 having their outer ends connected by means of links 110 with the cross-head 78 for raising the cap-supporting frame 68. An arm 111 which may, if desired, be integral with one of the arms 109 has a roller 112 at its end arranged to contact the cam portion 99. The weight of the caps and their supporting frame is sufficient to hold the roller 112 in contact with the cam portion 99.

Figure 1:
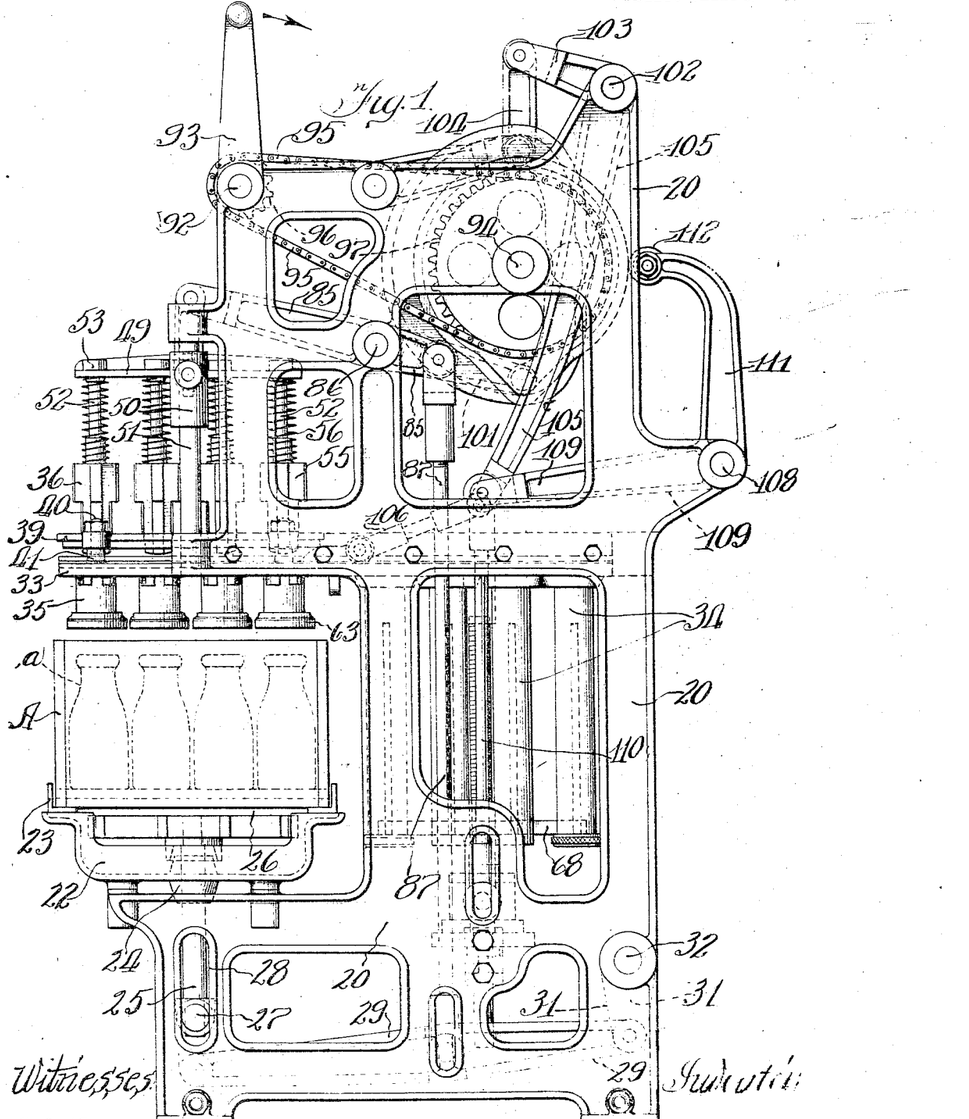
Figure 1 is a side elevation of a bottle-capping machine embodying the features of my invention.
Figure 2:
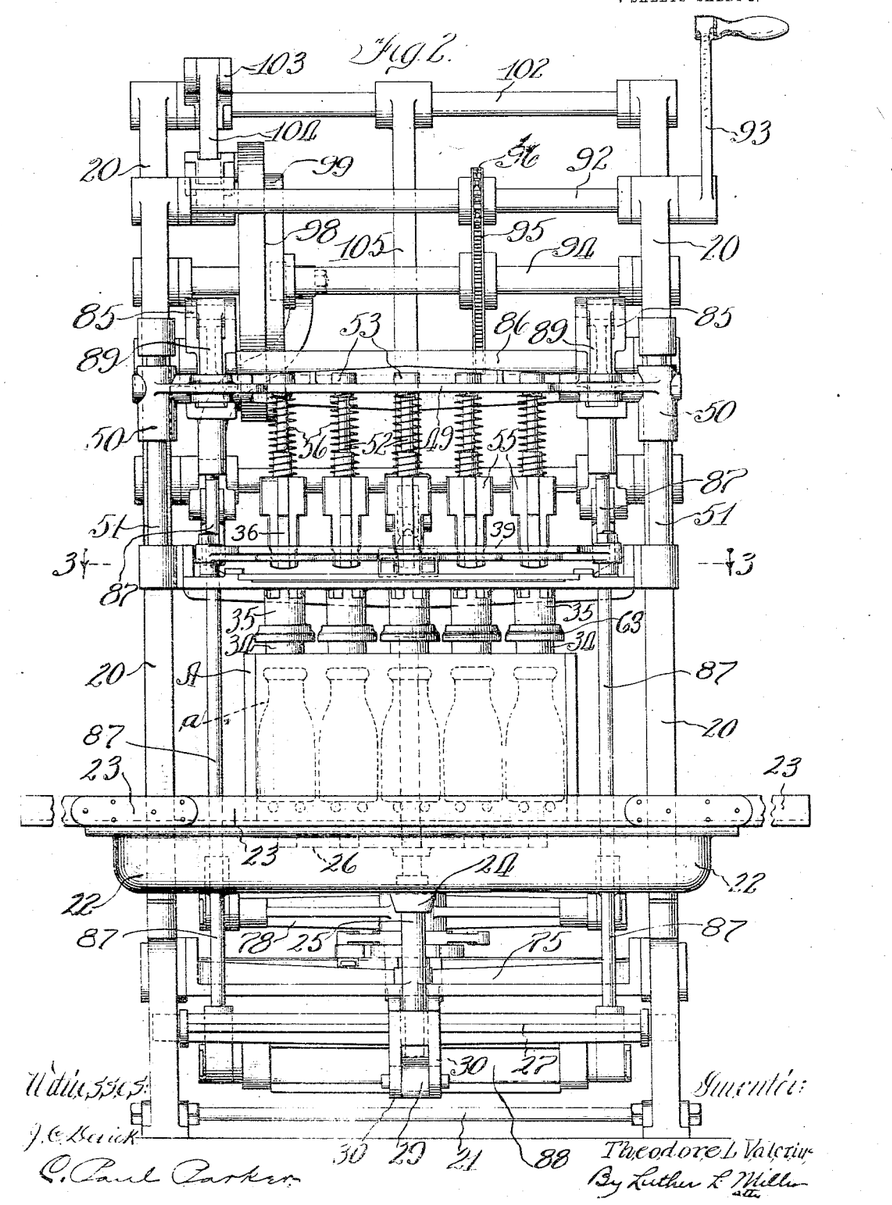
Fig. 2 is a front elevation of the machine.

Assuming the machine to be in the initial position indicated in Fig. 1, the cap-slide 42 being in its forward position and being charged with a set of caps, the operation is as follows: The crank 93 is rotated in the direction of the arrow to rotate the main shaft 94 and the cam 98. The roller at the end of the extension 101 on the arm 85, in following the cam-groove 100, simultaneously elevates the bottle-case A and depresses the plungers 36 to transfer the set of caps $b$ from the cap-slide 42 to the mouths of the bottles $a$. Continued rotation of the cam 98 then lowers the bottle-case and raises the plungers. It will be noted that in its working movement, the cam roller is drawn inwardly toward the center of the cam, greater leverage being thus obtained and the amount of power necessary to move the crank 93 being reduced. The arm 105 is now swung by the cam-groove 100 to move the cap-slide to its rearmost position above the cap-tubes 34. While the cap-slide is in this position the cam portion 99 swings the arm 111 to raise the cap-supporting frame 68 and press a set of caps against the cap-slide. Said cap-slide is now again moved forwardly, when the parts will be in the initial position shown in Fig. 1, the crank 93 having moved through three revolutions.

It should be understood that the machine herein shown is only one embodiment of my invention, wherefore no undue limitation should be taken from the foregoing detailed description.

I claim as my invention:

1. In a bottle-capping machine, the combination of vertically reciprocating cap-applying means, a plurality of cap magazines, a cap-transferring slide arranged to reciprocate from a point adjacent to said magazines to a point adjacent to said cap-applying means, and impaling points on said slide arranged to engage the end caps in said magazines and transfer said caps into position to be acted upon by said applying means.

2. In a bottle-capping machine, in combination, a plurality of cap magazines arranged vertically, said magazines having longitudinal slots therein, bars extending into said slots for supporting the caps therein, means for raising said bars to permit the top layer of caps to be removed, cap-applying means, and means for transferring caps from said magazines to said applying means, comprising a slide movable in a horizontal plane from a point adjacent to said magazines to a point adjacent said applying means.

3. In a bottle-capping machine, in combination, a plurality of cap tubes arranged vertically, cap-applying means, and a slide movable in a horizontal plane from a point above said cap tubes to a point in operative relation to said applying means, said slide having sharp points thereon arranged to pick up the top series of caps in said cap tubes.

4. In a bottle capping machine, in combination, a framework, a horizontal plate stationarily mounted therein, a plurality of cap tubes supported from the rear portion of said plate, cap-applying means adjacent to the forward portion of said plate, and a cap transferring plate slidable upon the first mentioned plate, said cap-transferring plate having a plurality of sharp projections against which the caps in said cap tubes are pushed at times, the caps being held by said projections and being transferred by said cap-plate from said cap-tubes into position to be operated upon by said applying means.

5. In a bottle-capping machine, in combination, means for supporting a case of bottles, cap-applying plungers positioned above the case-supporting means, yielding means for holding a supply of caps, means for raising said caps, means for adjusting vertically said cap-holding means, and means horizontally movable between said plunger and said bottle case for transferring caps from said cap-holding means into position to be acted upon by said plungers.

6. In a bottle-capping machine, in combination, means for supporting a case of bottles, a plurality of cap-applying plungers above said case-supporting means, yielding means for holding a supply of caps, means for raising said caps, means for adjusting vertically said cap-holding means, a slide arranged to transfer caps from said holding means into position to be acted upon by said plungers, and means for simultaneously raising said case-supporting means and depressing said plungers.

7. In a bottle-capping machine, the combination of a plurality of vertical cap-holding tubes, said tubes having longitudinal slots therein, a frame comprising bars extending through the slots, yielding means carried by said bars within the tubes for supporting the caps therein, and means for raising said frame to permit the top layer of caps to be removed.

8. In a bottle-capping machine, the combination of a plurality of vertical cap-holding tubes, said tubes having longitudinal slots therein, a frame comprising bars extending through the slots in said tubes, yielding means carried by said bars within the tube for supporting said caps therein, and means for adjusting said frame vertically.

9. In a bottle capper, a vertical tube adapted to contain a column of bottle caps, a slide horizontally reciprocable over the upper end of the tube, an impaling point on said slide, and means for raising the column of caps to press the topmost cap against said point.

10. In a bottle-capping machine, means for supporting a bottle, a plate having a cruciform opening therein, sharp points at the under side of said plate adjacent to said opening arranged to project into and support a cap, and a plunger cruciform in cross-section arranged to pass through said opening and transfer the cap to the mouth of the bottle.

11. In a bottle-capping machine, in combination, a framework, a horizontal plate stationarily mounted therein, said plate having a series of openings at its rear end, cap tubes having their upper ends fixed in said openings, said plate having a series of openings in its forward portion, sleeves supported by said plate and communicating with the said last mentioned openings, said sleeves being arranged to center the bottles, a cap-transferring plate slidable upon the first mentioned plate, said cap-transferring plate having a series of cruciform openings therein, and having sharp points at its under side adjacent to said openings, the caps in said cap tubes being pushed against said sharp points, said cap-transferring plate being movable to transfer a series of caps into position above said sleeves, and a plurality of plungers cruciform in cross-section arranged to project through the openings in said cap-transferring slide to push the caps from said slide and through said sleeves into the mouths of the bottles.

12. In a bottle-capping machine, in combination, means for supporting a bottle, a stationary plate having an opening therein, a sleeve supported by said plate and registering with said opening, said sleeve being arranged to center the bottle, means for holding a series of caps, a slidable plate having a cruciform opening therein, and having sharp points at its under side adjacent said opening, said sharp points being adapted to receive a cap from said cap-holding means, the upper end of said sleeve being notched to form a plurality of fingers adapted to enter the branches of said cruciform opening when said sleeve is lifted by the bottle, and a plunger cruciform in cross-section arranged to descend through the opening in said slidable plate to remove the cap therefrom and push the cap through said sleeve and into the mouth of the bottle.

13. In a bottle capper, a cap-transferring member having a downwardly projecting cap-impaling point, said member having an aperture which is vertically alined with a cap held by said point, and a member reciprocable through said aperture for disengaging the cap from the point.

14. In a bottle-capping machine, in combination, cap-applying means, a cap magazine, a slide having a sharp point thereon, said slide being movable from a position adjacent to said cap magazine into position adjacent to said applying means, and means for pressing the caps in said magazine against said point.

15. In a bottle-capping machine, in combination, cap-applying means, a plurality of cap tubes arranged vertically, a horizontally slidable cap-transferring plate, a plurality of sharp points upon the under side of said plate arranged to register with the upper end of said cap tubes, and means for pressing the caps in said tubes against said sharp points whereby to charge the slide with a series of caps.

16. In a bottle-capping machine, in combination, means for supporting a case of bottles, a plurality of cap-applying plungers positioned above the case-supporting means, means for placing caps in position to be acted upon by the plungers, and means for simultaneously raising said case supporting means and depressing said plungers, comprising levers attached to said case-supporting means and said plungers, a link connecting said levers, a rotatory cam and an extension on one of said levers arranged to be engaged by said cam.

17. In a bottle-capping machine, in combination, means for supporting a case of bottles, a plurality of cap-applying plungers above the case-supporting means, means for placing caps in position to be acted upon by said plungers, a lever for actuating said plungers and a rotary cam arranged to engage one end of said lever, said cam drawing the lever closer to the center of the cam during the working movement of the lever, whereby to increase the leverage of the cam.

18. In a bottle-capping machine, in combination, cap-applying means, a plurality of vertical cap tubes, said tubes having longitudinal slots therein, a cap-transferring slide arranged to remove the top caps from said tubes, a frame comprising bars extending through the slots in said tubes, yielding means carried by said bars within the tubes for supporting the caps therein, means for raising said frame to permit the top layer of caps to be removed, and means for adjusting said frame vertically.

19. In a bottle-capping machine, in combination, cap-applying means, a plurality of cap magazines, a cap-transferring slide, a lever for actuating said applying means, an arm for moving said slide, and a rotary cam for actuating said lever and said arm.

20. In a bottle-capping machine, in combination, cap-applying means, a plurality of cap magazines, a cap-transferring slide, an arm for moving said slide, a lever for actuating said applying means, a rotary cam for operating said arm and said lever, and a hand crank for rotating said cam, said crank moving a plurality of revolutions for each revolution of said cam.

21. In a bottle-capping machine in combination, cap-applying means, a plurality of cap magazines, a cap-transferring slide, an frame for supporting the caps in said magazines, a lever for raising said frame, an arm for moving said slide, a lever for operating said cap-applying means, and a rotary cam arranged to actuate said arm and said levers.

22. In a bottle-capping machine, a cap-transferring member having cap-attaching means, and means for vertically moving a tier of caps into and away from operative relation to said cap-attaching means.

23. In a bottle-capping machine, a cap-transferring member having a downwardly extending cap-impaling point, and means for raising a tier of caps to press the top cap against said point and for lowering the remainder of the tier.

24. In a bottle capper, a cap-transferring member having a downwardly projecting cap-impaling point, said member having an aperture which is vertically alined with a cap held by said point, and a cap-applying member reciprocable through said aperture for disengaging the cap from the point.

25. In a bottle-capping machine, a stationary vertical cap magazine, cap-removing means above said magazine, and means for raising caps in said magazine so that the top cap will be in operative relation to said cap-removing means and for lowering the remainder of the caps.

26. In a bottle-capping machine, a stationary vertical cap magazine, cap removing means above said magazine, means for raising caps in said magazine so that the top cap will be in operative relation to said cap-removing means and for lowering the remainder of the caps, and means for adjusting the raising means to compensate for variations in the quantity of caps in the magazine.

27. In a bottle-capping machine, a stationary vertical cap magazine, cap-removing means above said magazine, a cap-support in said magazine, means for raising and lowering said support to move the caps contained in the magazine into and out of operative relation to the cap-removing means, and means for adjusting said raising and lowering means to compensate for variations in the quantity of caps in the magazine.

28. In a bottle-capping machine, a cap magazine, cap-removing means above said magazine, a cap-support in said magazine, means for raising and lowering said support, said raising and lowering means comprising a vertical screw shaft carrying said support, and means for rotating said shaft to adjust the position of said support with reference to the raising and lowering means.

29. In a machine for capping cased bottles, a cap-transferring member having as many cap-receiving surfaces as there are bottles in the case, each of said surfaces having an opening therethrough and a cap-attaching means, a corresponding number of cap-seating plungers reciprocable through said openings, a corresponding number of cap magazines below the plane of said member, the latter being reciprocable from a position above the magazines to a position below the plungers, and means for lifting caps in the magazines into contact with the cap-attaching means.

30. In a bottle capper, a member having a downwardly projecting cap-impaling point, said member having an aperture which is vertically alined with a cap held by said point, a bell-mouthed member below the first-mentioned member adapted for contact with a bottle, and a cap-applying plunger reciprocable through said aperture for disengaging the cap from the point and seating said cap in the bottle.

31. In a bottle capper, a cap-transferring slide having a downwardly projecting cap-impaling point and an aperture which is vertically alined with a cap held by said point, an element below said slide, a bottle-centering sleeve supported by said element and vertically movable through the aperture in said slide, means for moving a bottle against the lower end of the sleeve and raising the latter, and a cap-applying plunger reciprocable through said aperture and said sleeve to move the cap through the sleeve and into the mouth of the bottle.

In testimony whereof I hereby affix my signature in the presence of two witnesses.

THEODORE L. VALERIUS.

Witnesses:
J. F. SCHREINER,
R. J. SMITH.